United States Patent
Liu et al.

(10) Patent No.: US 9,519,831 B2
(45) Date of Patent: Dec. 13, 2016

(54) METHOD AND APPARATUS FOR DETECTING GENERALIZED PASSERBY BY UTILIZING FEATURES OF A WHEEL AND UPPER BODY

(71) Applicant: Neusoft Corporation, Shenyang (CN)

(72) Inventors: Wei Liu, Shenyang (CN); Chengwei Duan, Shenyang (CN); Liying Chai, Shenyang (CN); Bing Yu, Shenyang (CN); Huai Yuan, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 0 days.

(21) Appl. No.: 14/562,771

(22) Filed: Dec. 8, 2014

(65) Prior Publication Data
US 2015/0186723 A1    Jul. 2, 2015

(30) Foreign Application Priority Data
Dec. 27, 2013 (CN) .......................... 2013 1 0738021

(51) Int. Cl.
*G06K 9/00*    (2006.01)
*G06K 9/62*    (2006.01)

(52) U.S. Cl.
CPC ....... *G06K 9/00624* (2013.01); *G06K 9/00362* (2013.01); *G06K 9/00805* (2013.01); *G06K 9/6267* (2013.01)

(58) Field of Classification Search
None
See application file for complete search history.

(56) References Cited

U.S. PATENT DOCUMENTS 5,995,663 A * 11/1999 Itsuzaki ............... G06K 9/48
382/203
2007/0165967 A1    7/2007 Ando et al.
(Continued)

FOREIGN PATENT DOCUMENTS

CN    102682304 A    9/2012
JP    2007134961 A    5/2007
(Continued)

OTHER PUBLICATIONS

Hyunggi Cho et al., Vision-based Bicycle Detection and Tracking using a Deformable Part Model and an EKF Algorithm, published in 2010 13th International IEEE Conference on Intelligent Transportation Systems (ITSC), 1875-1880, 7 pages.
(Continued)

*Primary Examiner* — Jason Heidemann
*Assistant Examiner* — Brian Shin
(74) *Attorney, Agent, or Firm* — Kilpatrick Townsend & Stockton LLP

(57) ABSTRACT

A method for detecting a generalized passerby includes: acquiring an input image; determining whether a preset common feature of a wheel exists in the input image; selecting an image window at left side or right side or upper side of a center of a region where the preset common feature of the wheel is located in a case that the preset common feature of the wheel exists in the input image; inputting the selected image window into a preset upper-body classifier; detecting whether an upper body of a passerby exists in the selected image window and outputting a first detection result.

9 Claims, 2 Drawing Sheets

(56) References Cited

U.S. PATENT DOCUMENTS

| | | | |
|---|---|---|---|
| 2012/0147188 A1* | 6/2012 | Yokochi | B60R 1/00 348/148 |
| 2013/0230245 A1* | 9/2013 | Matsumoto | G06K 9/00369 382/173 |
| 2013/0259307 A1 | 10/2013 | Torii et al. | |
| 2013/0259386 A1* | 10/2013 | Chandrashekar | G06K 9/4633 382/203 |

FOREIGN PATENT DOCUMENTS

| | | |
|---|---|---|
| JP | 2007187618 A | 7/2007 |
| JP | 2010211427 A | 9/2010 |
| JP | 2013210968 A | 10/2013 |

OTHER PUBLICATIONS

Hyunggi Cho et al., Vision-based Bicyclist Detection and Tracking for Intelligent Vehicles, 2010 IEEE Intelligent Vehicles Symposium, University of California, San Diego, CA, USA, Jun. 21-24, 2010, 8 pages.

Hossein Tehrani Niknejad et al., Embedded Multi-sensors Objects Detection and Tracking for Urban Autonomous Driving, 2011 IEEE Intelligent Vehicles Symposium (IV), Baden-Baden, Germany, Jun. 5-9, 2011, 8 pages.

Tong Li et al., An Effective Crossing Cyclist Detection on a Moving Vehicle, Proceedings of the 8th World Congress on Intelligent Control and Automation Jul. 6-9, 2010, Jinan, China, 5 pages.

Heewook Jung et al., Applying MSC-HOG Feature to the Detection of a Human on a Bicycle, 2012 12th International Conference on Control, Automation and Systems, Oct. 17-21, 2012 in ICC, Jeju Island, Korea, 4 pages.

Paul Viola et al., Detecting Pedestrians Using Patterns of Motion and Appearance, to appear in the Proceedings of the International Conference on Computer Vision (ICCV), Oct. 13, 2003, Nice, France, 10 pages.

Summary of the First Office Action for Chinese Application No. 201310738021.9, issue date May 30, 2016, 6 pages.

The First Office Action issued on Dec. 8, 2015 regarding a Japanese counterpart application (2014-258123).

* cited by examiner

METHOD AND APPARATUS FOR DETECTING GENERALIZED PASSERBY BY UTILIZING FEATURES OF A WHEEL AND UPPER BODY

This application claims priority to Chinese Patent Application No. 201310738021.9, entitled "METHOD AND APPARATUS FOR DETECTING GENERALIZED PASSERBY", filed with the Chinese State Intellectual Property Office on Dec. 27, 2013, which is incorporated by reference in its entirety herein.

FIELD

The disclosure relates to the field of an intelligent transportation system, and particularly to a method and an apparatus for detecting a generalized passerby.

BACKGROUND

Currently, vision-based sensors are attracting more and more attentions. From the perspective of environmental perception, the vision-based sensors have advantages such as more and richer available information, short sampling period, less interference from a magnetic field and other sensors, low weight, small energy consumption, low cost and convenient usage, and thus the vision-based sensors play a more and more important role in active safety of urban roads. Vision-based active protection technologies for vulnerable road users such as passerby have been a research hotspot at home and abroad.

A generalized passerby may refer to a vulnerable road user such as a walking pedestrian, a bicycle rider or a motorcycle rider. An existing research on the vision-based active protection technologies for vulnerable road users such as passerby is mainly limited to passerby detection in the usual sense, i.e., detection for the walking pedestrian, and there are few researches on the vulnerable generalized passerby of the road users such as the bicycle rider or the motorcycle rider.

In the traditional technology, the bicycle rider and the motorcycle rider are treated as objects different from the pedestrian. Samples of the bicycle rider and samples of the motorcycle rider are collected respectively. Features of the bicycle rider and features of the motorcycle rider are extracted from a preset rider sample database, and a classifier for the bicycle rider and a classifier for the motorcycle rider are generated by training with the extracted features. An input image is detected by the classifiers, to determine whether a bicycle rider or a motorcycle rider exists in the input image.

In the above solution, it takes a lot of time to collect the samples, extract the features and train the classifiers, which results in a time-consuming and low-efficiency detection.

SUMMARY

The problem to be solved in the embodiments of the application is how to reduce the time for collecting the samples and improve the efficiency for detecting a generalized passerby.

In order to solve the problem described above, an embodiment of the disclosure provides a method for detecting a generalized passerby, including: acquiring an input image; determining whether a preset common feature of a wheel exists in the input image, selecting an image window at left side or right side or upper side of a center of a region where the preset common feature of the wheel is located in a case that the preset common feature of the wheel exists in the input image, inputting the selected image window into a preset upper-body classifier, detecting whether an upper body of a passerby exists in the selected image window, and outputting a first detection result, where the preset upper-body classifier is generated by training with a preset common feature of a generalized passerby, the preset common feature of the generalized passerby includes a common feature of a human body, and the preset common feature of the wheel includes a circle feature and an oval feature.

Optically, the method for detecting the generalized passerby may further include: pre-processing the input image, inputting the pre-processed image into a preset whole-body classifier, detecting whether a whole body of a passerby exists in the pre-processed image, and outputting a second detection result, where the preset whole-body classifier is generated by training with the preset common feature of the generalized passerby, and the preset common feature of the generalized passerby includes a common feature of a human body.

Optionally, pre-processing the input image and inputting the pre-processed image into the preset whole-body classifier may include: acquiring at least two images having different resolutions by processing the input image using a pyramid down-sampling technology, respectively dividing the images having different resolutions into multiple small-window images having a same size as those of samples for training the preset whole-body classifier, and inputting the small-window images into the preset whole-body classifier in sequence.

Optionally, selecting the image window at left side or right side or upper side of the center of the region where the preset common feature of the wheel is located in a case that the preset common feature of the wheel exists in the input image may include selecting the image window at left side or right side or upper side of the center of the region where the preset common feature of the wheel is located based on a size of the region where the preset common feature of the wheel is located, and selecting the image window may include: selecting an image window having a width of w=2kr and a length of l=3kr, with a value range of the image window in a horizontal direction being [x−6r, x+6r] and a value range of the image window in a vertical direction being [y−3r, y+3r], where k is a scaling factor, r is a radius of the region where the preset common feature of the wheel is located, and x and y are coordinates of the center of the region where the preset common feature of the wheel is located.

Optionally, the common feature of the human body includes a head feature, a shoulder feature and a torso feature.

The head feature includes a head region depicted with a first color and a background region depicted with a second color. Each of the head region and the background region is rectangular, the head region is located within the background region and a lower edge of the head region and a lower edge of the background region are coincided, the region depicted with the second color has an area which is N1 times as great as that of the region depicted with the first color, a feature value of the head feature is $a1=|b1-c1|$, where $b1$ is a sum of values of pixels in the region depicted with the second color, $c1$ is N1 times as great as a sum of values of pixels in the region depicted with the first color, and N1 is a positive value.

The shoulder feature includes a shoulder region depicted with the first color and a background region depicted with the second color. Each of the shoulder region and the background region is rectangular, the shoulder region is located at a lower left corner of the background region with a left edge and a lower edge of the shoulder region and a left edge and a lower edge of the background region being coincided respectively, or the shoulder region is located at a lower right corner of the background region with a right edge and a lower edge of the shoulder region and a right edge and a lower edge of the background region being coincided respectively, the region depicted with the second color has an area which is N2 times as great as that of the region depicted with the first color, a feature value of the shoulder feature is $a2=|b2-c2|$, where b2 is a sum of values of pixels in the region depicted with the second color, c2 is N2 times as great as a sum of values of pixels in the region depicted with the first color, and N2 is a positive value.

The torso feature includes a vertical torso feature and an inclined torso feature.

The vertical torso feature includes a first vertical torso feature and a second vertical torso feature. The first vertical torso feature includes a first vertical torso region depicted with the first color and a background region depicted with the second color, the first vertical torso region and the background region are located in a same rectangle, the region depicted with the second color has an area which is N3 times as great as that of the region depicted with the first color, a feature value of the first vertical torso feature is $a3=|b3-c3|$, where b3 is a sum of values of pixels in the region depicted with the second color, c3 is N3 times as great as a sum of values of pixels in the region depicted with the first color, and N3 is a positive value. The second vertical torso feature includes a second vertical torso region depicted with the first color and a background region depicted with the second color, each of the second vertical torso region and the background region is rectangular, the second vertical torso region is parallel with the background region in a vertical direction, the region depicted with the first color has an area equal to that of the region depicted with the second color, the region depicted with the first color is separated from the region depicted with the second color by M1 pixels, a feature value of the first vertical torso feature is $a4=|b4-c4|$, where b4 is a sum of values of pixels in the region depicted with the second color, and c4 is a sum of values of pixels in the region depicted with the first color.

The inclined torso feature includes an inclined torso region depicted with the first color and a background region depicted with the second color, each of the inclined torso region and the background region is rectangular, an inclination angle of the inclined torso region is equal to an inclination angle of the background region, and the background region is located at left side or right side or upper side of the inclined torso region, the region depicted with the first color has an area equal to that of the region depicted with the second color, the region depicted with the first color is separated from the region depicted with the second color by M2 pixels, a feature value of the inclined torso feature is $a5=|b5-c5|$, where b5 is a sum of values of pixels in the region depicted with the second color, and c5 is a sum of values of pixels in the region depicted with the first color.

In order to solve the problem described above, an embodiment of the disclosure further provides an apparatus for detecting a generalized passerby, including:

an acquiring unit configured to acquire an input image;

a first detecting unit configured to determine whether a preset common feature of a wheel exists in the input image, select an image window at left side or right side or upper side of a center of a region where the preset common feature of the wheel is located in a case that the preset common feature of the wheel exists in the input image, input the selected image window into a preset upper-body classifier, detect whether an upper body of a passerby exists in the selected image window, and output a first detection result, where the preset upper-body classifier is generated by training with a preset common feature of a generalized passerby, the preset common feature of the generalized passerby includes a common feature of a human body, and the preset common feature of the wheel includes a circle feature and an oval feature.

Optionally, the apparatus for detecting the generalized passerby may further include: a second detecting unit configured to pre-process the input image, input the pre-processed image into a preset whole-body classifier, detect whether a whole body of a passerby exists in the pre-processed image, and output a second detection result, where the preset whole-body classifier is generated by training with a preset common feature of a generalized passerby, and the preset common feature of the generalized passerby includes a common feature of a human body.

Optionally, the second detecting unit is configured to acquire at least two images having different resolutions by processing the input image using a pyramid down-sampling technology, respectively divide the images having different resolutions into multiple small-window images having a same size as those of samples for training the preset whole-body classifier, and input the small-window images into the preset whole-body classifier in sequence.

Optionally, the first detecting unit is configured to select the image window at left side or right side or upper side of the center of the region where the preset common feature of the wheel is located based on a size of the region where the preset common feature of the wheel is located, and selecting the image window includes: selecting an image window having a width of w=2kr and a length of l=3kr, with a value range of the image window in a horizontal direction being [x−6r, x+6r] and a value range of the image window in a vertical direction being [y−3r, y+3r], where k is a scaling factor, a value range of k is greater than or equal to 1 and less than or equal to 3, r is a radius of the region where the preset common feature of the wheel is located, and x and y are coordinates of the center of the region where the preset common feature of the wheel is located.

It is determined whether a common feature of a wheel exists in the input image, and an image window is selected at the left side or the right side or the upper side of the center of a region where the preset common feature of the wheel is located if the preset common feature of the wheel exists in the input image. The selected image window is input into a preset upper-body classifier to detect the image window and output the detection result. The upper-body classifier may be generated by training with a common feature of a generalized passerby, and if the common feature of the wheel exists in the input image, an image window is selected at the left side or the right side or the upper side of the center of the region where the preset common feature of the wheel is located and is input into the upper-body classifier for detection, then a rider can be determined if an upper body of a passerby exists in the selected image window. In this way, the time for collecting the samples can be reduced and the efficiency for detecting the generalized passerby is improved since it is not required to collect samples of the rider, extract common features of the rider and train the classifiers for the rider.

Furthermore, at least two images having different sizes are acquired by pre-processing the input image using a pyramid sampling technology. The images having different resolutions are input into the preset whole-body classifier in sequence. Whether a whole body of a passerby exists in the input image is detected and the detection result is output. In this way, the accuracy for detecting the generalized passerby can be improved effectively.

In addition, the region where the preset common feature of the wheel is located is acquired if the common feature of the wheel exists in the input image. The size and position of the image window are adjusted based on the size of the region where the preset common feature of the wheel is located. The image window is detected by using the preset upper-body classifier for the generalized passerby. In this way, the accuracy of the detection result can be further improved.

DETAILED DESCRIPTION

In the traditional technology, a bicycle rider and a motorcycle rider are treated as different objects. Samples of the bicycle rider and samples of the motorcycle rider are collected respectively, to establish a sample database of the bicycle rider and a sample database of the motorcycle rider. Features of the bicycle rider and features of the motorcycle rider are extracted from the sample database of the bicycle rider and the sample database of the motorcycle rider respectively, and a bicycle rider classifier and a motorcycle rider classifier are generated by training with the extracted features. However, since the rider has various postures and the bicycle and the motorcycle have multiple models and types, a large number of rider samples need to be collected to extract complex and diverse features and train different classifiers to detect an input image. Therefore, it is required a lot of time to collect the samples, extract the features and train the classifiers, which results in a time-consuming and low-efficiency detection.

In the present disclosure, it is determined whether a common feature of a wheel exists in the input image, and an image window is selected at the left side or the right side or the upper side of the center of region where the preset common feature of the wheel is located if the preset common feature of the wheel exists in the input image. The selected image window is input into the preset upper-body classifier to detect the image window and output the detection result. The upper-body classifier may be generated by training with a common feature of a generalized passerby, and if the common feature of the wheel exists in the input image, an image window is selected at the left side or the right side or the upper side of the center of the region where the preset common feature of the wheel is located and is input into the upper-body classifier for detection, then a rider can be determined if an upper body of a passerby exists in the selected image window. In this way, the time for collecting the samples can be reduced and the efficiency for detecting the generalized passerby is improved since it is not required to collect samples of the rider, extract common features of the rider and train the classifiers for the rider.

In order to make the above objects, features and advantages of the embodiments of the disclosure clearer, the embodiments of the disclosure will be illustrated in detail below in conjunction with the drawings.

Figure 1:
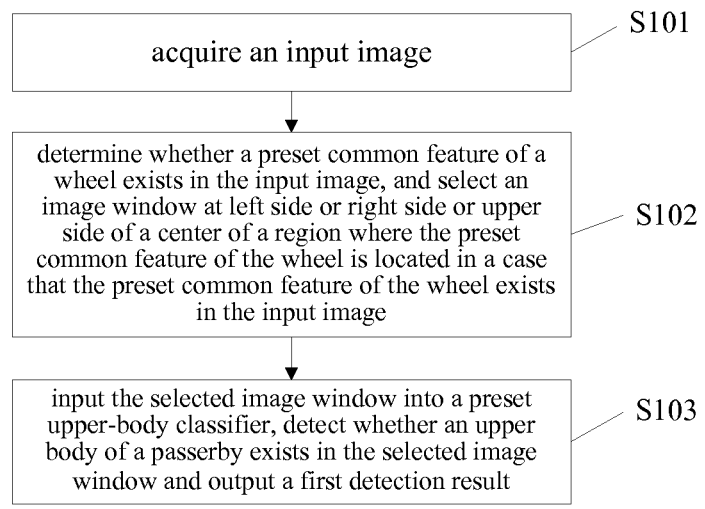
FIG. 1 is a flow chart of a method for detecting a generalized passerby according to an embodiment of the disclosure.

An embodiment of the disclosure provides a method for detecting a generalized passerby, which is illustrated in detail below with reference to FIG. 1.

In S101, an input image is acquired.

In an implementation, the input image may be acquired in advance, or may be acquired by a preset image acquiring apparatus in a real time manner, for example, the image may be acquired by a camera in a real time manner.

In S102, whether a preset common feature of a wheel exists in the input image is determined, and an image window is selected at the left side or the right side or the upper side of a center of a region where the preset common feature of the wheel is located in a case that the preset common feature of the wheel exists in the input image.

Figure 3:
FIG. 3 is a common feature of a wheel according to an embodiment of the disclosure.

In an implementation, the common feature of the wheel may be as shown in FIG. 3, in which a circle feature of the common feature of the wheel may be described by 301 which is a circle and may represent a wheel feature taken from a viewing angle vertical to the wheel, and an oval feature of the common feature of the wheel may be described by 302 which is an oval and may represent a wheel feature taken from a viewing angle having a certain angle with respect to the wheel.

In an implementation, after the input image is acquired, the input image may be detected by using a detection algorithm for a circle or a detection algorithm for an oval, to determine whether a circle or an oval exists in the input image. For example, an edge may be extracted from the input image firstly, and whether a circle or an oval exists is detected by using an algorithm such as Hough Transform or fast radial symmetric, to determine circular candidate regions or oval candidate regions; circular candidate regions or oval candidate regions violating a geometric constraint are removed based on a perspective projection principle and parameters of the image acquiring apparatus; and an image window is selected in the input image for a remaining circular region or oval region based on the radius thereof.

In S103, the selected image window is input into a preset upper-body classifier, whether an upper body of a passerby exists in the selected image window is detected and a first detection result is output. The preset upper-body classifier is generated by training with a preset common feature of a generalized passerby. The common feature of the generalized passerby includes a common feature of a human body. The common feature of the wheel includes a circle feature and an oval feature.

In an implementation, the first detection result may include the size of the image window in which the upper body of the passerby exists, or may include a region (position or size of the region) of the image window, in which the upper body of the passerby exists, within the input image, or may include both the size of the image window in which the upper body of the passerby exists and the region of the image window, in which the upper body of the passerby exists, within the input image.

In an implementation, in a case that it is detected by the upper-body classifier that the upper body of the passerby exists in the image window selected at the left side or the right side or the upper side of the center of the region where the preset common feature of the wheel is located, that is, the upper body of the passerby is at the upper side or the left side or the right side of the wheel, it is considered that a rider exists in the input image.

In an implementation, the common feature of the human body may include a head feature, a shoulder feature and a torso feature. The common feature of the human body is illustrated in detail below with reference to FIG. 2.

In an implementation, the head feature may be described to be a head region depicted with a first color and a background region depicted with a second color. Each of the head region and the background region is a rectangle. As shown by 201 in FIG. 2, the head region may be represented with black and the background region may be represented with white, the head region is located within the white region, and a lower edge of the head region and a lower edge of the background region are coincided with each other. The area of the region depicted with the second color is N1 times as great as the area of the region depicted with the first color. A feature value of the head feature is $a1=|b1-c1|$, where b1 is a sum of values of pixels in the region depicted with the second color, and c1 is N1 times as great as a sum of values of pixels in the region depicted with the first color. N1 is a positive value, and a value range of N1 is greater than 1 and less than or equal to 3.

In an implementation, the shoulder feature may be described to be a shoulder region depicted with the first color and a background region depicted with the second color. Each of the shoulder region and the background region is a rectangle. As shown by 202 in FIG. 2, the shoulder region may be represented with black, and the background region may be represented with white. The shoulder region is located at a lower left corner of the background region with a left edge and a lower edge of the shoulder region and a left edge and a lower edge of the background region being coincided respectively, or the shoulder region is located at a lower right corner of the background region with a right edge and a lower edge of the shoulder region and a right edge and a lower edge of the background region being coincided respectively. As shown by 203 in FIG. 2, the shoulder region may be represented with black and the background region may be represented with white, the shoulder region is located at the lower right corner of the background region with the right edge and the lower edge of the shoulder region and the right edge and the lower edge of the background region being coincided respectively. The area of the region depicted with the second color is N2 times as great as the area of the region depicted with the first color. A feature value of the shoulder feature is $a2=|b2-c2|$, where b2 is a sum of values of pixels in the region depicted with the second color, and c2 is N2 times as great as a sum of values of pixels in the region depicted with the first color. N2 is a positive value, and a value range of N2 is greater than 2 and less than or equal to 4.

In an implementation, the torso feature may be described to be a vertical torso feature and an inclined torso feature. The vertical torso feature may include a first vertical torso feature and a second vertical torso feature. The first vertical torso feature may be described to be a first vertical torso region depicted with the first color and a background region depicted with the second color. The first vertical torso region and the background region are located in a same rectangle. As shown by 204 in FIG. 2, the first vertical torso region may be represented with black and the background region may be represented with white, the first vertical torso region and the background region are located in a same rectangle, and the area of the background region is greater than the area of the first vertical torso region in a horizontal direction. A feature value of the first vertical torso feature is $a3=|b3-c3|$, where b3 is a sum of values of pixels in the region depicted with the second color, and c3 is N3 times as great as a sum of values of pixels in the region depicted with the first color. N3 is a positive value, and a value range of N3 is greater than 1.

In an implementation, the second vertical torso feature may be described to be a second vertical torso region depicted with the first color and a background region depicted with the second color. Each of the second vertical torso region and the background region is a rectangle. As shown by 205 in FIG. 2, the second vertical torso region may be represented with black and the background region may be represented with white, the second vertical torso region is parallel with the background region, and the second vertical torso region and the background region have a gap there between and have same areas. The region depicted with the first color is separated from the region depicted with the second color by M1 pixels. A feature value of the first vertical torso feature is $a4=|b4-c4|$, where b4 is a sum of values of pixels in the region depicted with the second color, and c4 is a sum of values of pixels in the region depicted with the first color. A value range of M1 is greater than or equal to 1 and less than or equal to 3.

In an implementation, the inclined torso feature may be described to be an inclined torso region depicted with the first color and a background region depicted with the second color. Each of the inclined torso region and the background region is a rectangle. An inclination angle of the inclined torso region is equal to an inclination angle of the background region. The background region is located at the left side or the right side or the upper side of the inclined torso region. As shown by 206 and 207 in FIG. 2, the inclined torso region may be represented with black and the background region may be represented with white, and the background region is located at the upper side of the inclined torso region and is parallel with the inclined torso region. The area of the region depicted with the first color is equal to the area of the region depicted with the second color. The region depicted with the first color is separated from the region depicted with the second color by M2 pixels. A feature value of the inclined torso feature is $a5=|b5-c5|$, where b5 is a sum of values of pixels in the region depicted with the second color, and c5 is a sum of values of pixels in the region depicted with the first color. A value range of M2 is greater than or equal to 1 and less than or equal to 3.

Figure 2:
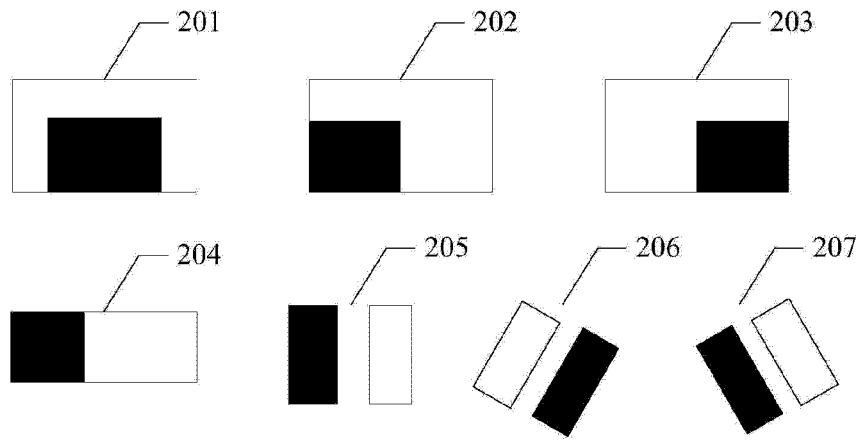
FIG. 2 is a common feature of a generalized passerby according to an embodiment of the disclosure.

In the embodiment of the disclosure, as shown in FIG. 2, the first color may be black, and the second color may be white. It may be understood that the first color may be white and the second color may be black, as long as the relationship between the common feature of the human body and the background is met. Similarly, other colors may also be used as the first color and the second color, which is not described herein in detail.

In the solution according to the embodiment of the disclosure, whether a preset common feature of a wheel exists in the input image is determined, and an image window is selected at the left side or the right side or the upper side of the center of the region where the preset common feature of the wheel is located if the preset common feature of the wheel exists in the input image. The selected image window is input into a preset upper-body classifier, to detect the image window and output the detection result. The upper-body classifier may be generated by training with a common feature of a generalized passerby, and if the common feature of the wheel exists in the input image, an image window is selected at the left side or the right side or the upper side of the center of the region where the preset common feature of the wheel is located and is input into the upper-body classifier for detection, then a rider can be determined if an upper body of a passerby exists in the selected image window. In this way, the time for collecting the samples can be reduced and the efficiency for detecting the generalized passerby is improved since it is not required to collect samples of the rider, extract common features of the rider and train the classifiers for the rider.

Figure 4:
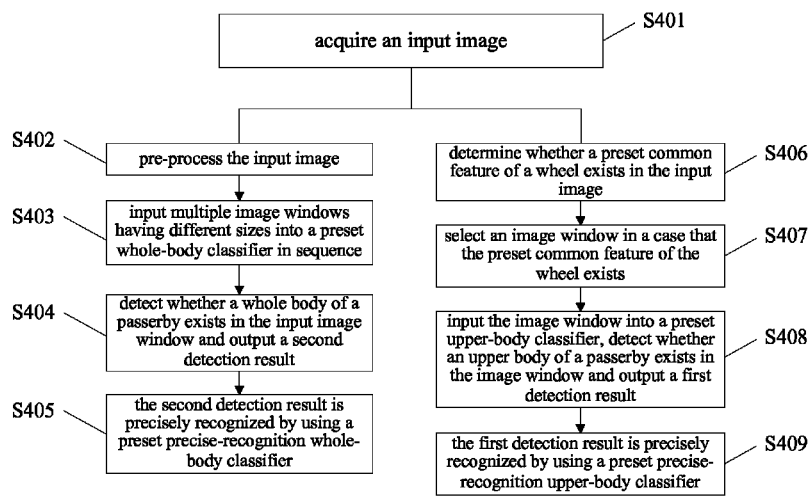
FIG. 4 is a flow chart of another method for detecting a generalized passerby according to an embodiment of the disclosure.

An embodiment of the disclosure further provides another method for detecting a generalized passerby, which is illustrated in detail below with reference to FIG. 4.

In S401, an input image is acquired.

In S402, the input image is pre-processed.

In the embodiment of the disclosure, pre-processing the input image may be processing the input image by using a pyramid down-sampling technology, to obtain at least two images having different resolutions, and respectively dividing the images having different resolutions into multiple small-window images having the same size as those of samples for training the preset whole-body classifier. The input image may also be pre-processed by using other technologies as long as the pre-processed image can be detected by the preset whole-body classifier, which is not described herein in detail.

In S403, the small-window images are input into the preset whole-body classifier in sequence.

In the embodiment of the disclosure, the preset whole-body classifier may be obtained as follows: collecting a sample database of the passerby, extracting a common feature of a human body by using the sample database of the passerby, and generating a whole-body classifier by training with the common feature of the human body.

In S404, whether a whole body of a passerby exists in the input image window is detected by the whole-body classifier, and a second detection result is output.

Whether a whole body of a passerby exists in the input image is obtained after 5404.

In the embodiment of the disclosure, the second detection result obtained in 5404 may be further detected.

In S405, the second detection result is recognized precisely by using a preset precise-recognition whole-body classifier.

In the embodiment of the disclosure, the precise-recognition whole-body classifier may be obtained as follows: collecting sample pictures and background pictures of a whole body of a passerby, training a Support Vector Machine (SVM) classifier by a Histogram of Oriented Gradient (HOG) feature or a Local Binary Pattern (LBP) feature, etc., or training different whole-body posture classifiers by postures of the whole body of the passerby and integrating the different whole-body posture classifiers into a precise-recognition whole-body classifier.

In the solution of the embodiment of the disclosure, the input image is pre-processed by using a pyramid sampling technology, to acquire at least two images having different sizes. The images having different resolutions are input into the preset whole-body classifier in sequence, then whether a whole body of a passerby exists in the input image is detected and the detection result is output. In this way, the accuracy of detecting the generalized passerby can be improved effectively.

In the embodiment of the disclosure, S402 to S405 may be used to detect whether a whole body of a passerby exists in the input image, that is, detect whether a walking pedestrian exists in the input image. In an implementation, the solution of the embodiment may be combined with the method for detecting a rider described in the previous embodiment, which may refer to the following steps.

In S406, whether a preset common feature of a wheel exists in the input image.

In the embodiment of the disclosure, the input image may be detected by using a preset circle detection algorithm or a preset oval detection algorithm, to determine whether a circular region or an oval region exists in the input image. A circular region or an oval region violating a geometric constraint is excluded, and the remaining circular region or oval region is the region where the common feature of the wheel is located.

In S407, in a case that the preset common feature of the wheel exists in the input image, an image window is selected at the left side or the right side or the upper side of the center of the region where the preset common feature of the wheel is located.

In the embodiment of the disclosure, the image window may be selected as follows: selecting an image window having a width of w=2kr and a length of l=3rk, where k is a scaling factor. A value range of the image window in a horizontal direction is [x−6r, x+6r], and a value range of the image window in a vertical direction is [y−3r, y+3r], where r is a radius of the region where the preset common feature of the wheel is located, and x and y are coordinates of the center of the region where the preset common feature of the wheel is located. In an implementation, a value range of k may be 3≥k≥1.

In the embodiment of the disclosure, the image window may be slid within the value range in the horizontal direction, or may be slid within the value range in the vertical direction, or may be slid within both the value range in the horizontal direction and the value range in the vertical direction. The step for the slide may be one pixel, or two or more pixels, which may be selected as needed.

In S408, the image window selected in S407 is input into the preset upper-body classifier, whether an upper body of a passerby exists in the image window is detected, and a first detection result is output.

In the embodiment of the disclosure, in a case that an upper body of a passerby exists in the image window, it may be considered that a rider exists in the input image. The first detection result may include the size of the image window in which the upper body of the passerby exists, or may include a region (position of size of the region) of the image window, in which the upper body of the passerby exists, within the input image, or may include both the size of the image window in which the upper body of the passerby exists and the region of the image window within the input image.

In the embodiment of the disclosure, the first detection result output in 5408 may be further detected.

In S409, the first detection result is recognized precisely by using a preset precise-recognition upper-body classifier.

In the embodiment of the disclosure, the precise-recognition upper-body classifier may be obtained as follows: collecting sample pictures and background pictures of an upper body of a passerby, training an upper-body SVM classifier by a HOG feature or an LBP feature, etc., or training different upper-body posture classifiers by postures of the upper body of the passerby and integrating the different upper-body posture classifiers into a precise-recognition upper-body classifier.

It may be understood that after S401 is performed, S402 to S405 may be performed before S406 to S409, or S406 to S409 may be performed before S402 to S405, or S402 to S405 and S406 to S409 may be performed simultaneously.

In the solution of the embodiment of the disclosure, in a case that the preset common feature of the wheel exists in the input image, the region where the preset common feature of the wheel is located may be acquired, and the size and the position of the image window are adjust based on the size of the region where the preset common feature of the wheel is located, and the image window is detected by using the preset upper-body classifier. In this way, the accuracy of the detection result can be further improved.

Figure 5:
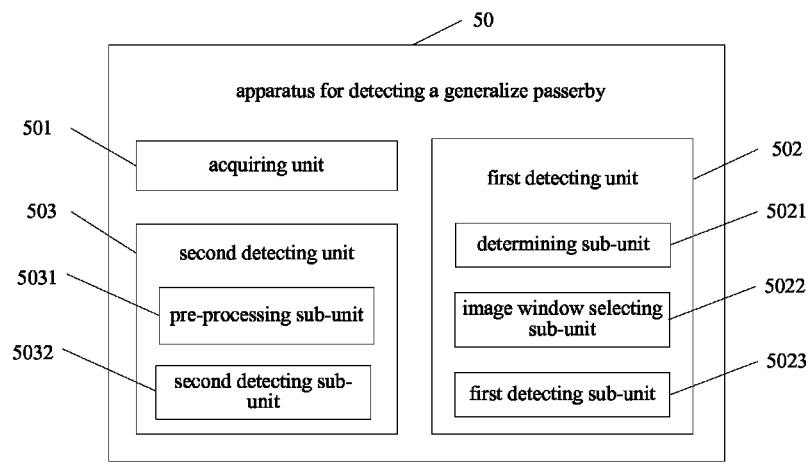
FIG. 5 is a schematic structural diagram of an apparatus for detecting a generalized passerby according to an embodiment of the disclosure.

With reference to FIG. 5, an embodiment of the disclosure further provides an apparatus 50 for detecting a generalized passerby, which includes an acquiring unit 501, a first detecting unit 502 and a second detecting unit 503.

The acquiring unit 501 is configured to acquire an input image.

The first detecting unit 502 is configured to determine whether a preset common feature of a wheel exists in the input image, select an image window at the left side or the right side or the upper side of a center of a region where the preset common feature of the wheel is located in a case that the preset common feature of the wheel exists in the input image, input the selected image window into a preset upper-body classifier, detect whether an upper body of a passerby exists in the selected image window and output a first detection result, where the preset upper-body classifier is generated by training with a preset common feature of a generalized passerby, the common feature of the generalized passerby includes a common feature of a human body, and the preset common feature of the wheel includes a circle feature and an oval feature.

In an implementation, the first detecting unit 502 may include: a determining sub-unit 5021 configured to determine whether the preset common feature of the wheel exists in the input image; an image window selecting sub-unit 5022 configured to select an image window in the input image in a case that the preset common feature of the wheel exists in the input image, and input the selected image window into the preset upper-body classifier; and a first detecting sub-unit 5023 configured to detect whether an upper body of a passerby exists in the selected image window and output a first detection result.

In an implementation, the image window selecting sub-unit 5022 is configured to select an image window at the left side or the right side or the upper side of the center of the region where the preset common feature of the wheel is located based on the size of the region where the preset common feature of the wheel is located.

In an implementation, the image window selecting sub-unit 5022 is configured to select an image window having a width of w=2kr and a length of l=3kr, with a value range of the image window in a horizontal direction being [x−6r, x+6r] and a value range of the image window in a vertical direction being [y−3r, y+3r], where k is a scaling factor, and a value range of k is greater than or equal to 1 and less than or equal to 3, r is a radius of the region where the preset common feature of the wheel is located, and x and y are coordinates of the center of the region where the preset common feature of the wheel is located.

In an implementation, the apparatus 50 for detecting the generalized passerby may further include: a second detecting unit 503 configured to pre-process the input image, input the pre-processed image into a preset whole-body classifier, detect whether a whole body of a passerby exists in the pre-processed image and output a second detection result, where the preset whole-body classifier is generated by training with a preset common feature of a generalized passerby, the preset common feature of the generalized passerby includes a common feature of a human body.

In an implementation, the second detecting unit 503 may include: a pre-processing sub-unit 5031 configured to pre-process the input image, and input the pre-processed image into a preset whole-body classifier; and a second detecting sub-unit 5032 configured to detect whether a whole body of a passerby exists in the pre-processed image input by the pre-processing sub-unit 5031, and output a second detection result.

In an implementation, the pre-processing sub-unit 5031 is configured to acquire at least two images having different resolutions by processing the input image using a pyramid down-sampling technology, and respectively divide the images having different resolutions into multiple small-window images having a same size as those of samples for training the preset whole-body classifier, and input the small-window images into the preset whole-body classifier in sequence.

It may be understood by those skilled in the art that all or a few of steps in the various methods of the embodiments described above may be realized by instructing related hardware by using a program. The program may be stored in a computer readable storage medium, and the storage medium may include a ROM, a RAM, a magnetic disk, an optical disk and the like.

Although the disclosure is disclosed as above, the disclosure is not limited thereto. Various changes or modifications can be made by those skilled in the art without departing from the sprit and scope of the disclosure. Therefore, the scope of protection of the disclosure should be consistent with the scope defined in the claims.

The invention claimed is:

1. A method for detecting a generalized passerby, comprising:
   acquiring an input image;
   determining whether a preset common feature of a wheel exists in the input image;
   selecting an image window at left side or right side or upper side of a center of a region where the preset common feature of the wheel is located in a case that the preset common feature of the wheel exists in the input image; and
   inputting the selected image window into a preset upper-body classifier, detecting whether an upper body of a passerby exists in the selected image window and outputting a first detection result,
   wherein the preset upper-body classifier is generated by training with a preset common feature of a generalized passerby, the preset common feature of the generalized passerby comprises a common feature of a human body, and the preset common feature of the wheel comprises a circle feature and an oval feature,
   wherein selecting the image window at left side or right side or upper side of the center of the region where the preset common feature of the wheel is located comprises:
   determining a size of the image window based on a radius of the region where the preset common feature of the wheel is located; and
   determining a position of the image window based on the radius of the region where the preset common feature of the wheel is located and the center of the region where the preset common feature of the wheel is located.

2. The method for detecting the generalized passerby according to claim 1, further comprising:
pre-processing the input image, inputting the pre-processed image into a preset whole-body classifier, detecting whether a whole body of a passerby exists in the pre-processed image and outputting a second detection result, wherein the preset whole-body classifier is generated by training with the preset common feature of the generalized passerby and the preset common feature of the generalized passerby comprises the common feature of the human body.

3. The method for detecting the generalized passerby according to claim 2, wherein pre-processing the input image and inputting the pre-processed image into the preset whole-body classifier comprises:
acquiring at least two images having different resolutions by processing the input image using a pyramid down-sampling technology, respectively dividing the images having different resolutions into a plurality of small-window images having a same size as those of samples for training the preset whole-body classifier, and inputting the small-window images into the preset whole-body classifier in sequence.

4. The method for detecting the generalized passerby according to claim 1, wherein determining the size of the image window based on the radius of the region where the preset common feature of the wheel is located comprises:
selecting an image window having a width of w=2kr and a length of l=3kr; and
determining the position of the image window based on the radius of the region where the preset common feature of the wheel is located and the center of the region where the preset common feature of the wheel is located comprises:
determining the position of the image window, with the position of the image window being within a value range of [x−6r, x+6r] in a horizontal direction and within a value range of [y−3r, y+3r] in a vertical direction,
wherein k is a scaling factor, r is a radius of the region where the preset common feature of the wheel is located, and x and y are coordinates of the center of the region where the preset common feature of the wheel is located.

5. The method for detecting the generalized passerby according to claim 1, wherein the common feature of the human body comprises a head feature, a shoulder feature and a torso feature, wherein
the head feature comprises a head region depicted with a first color and a background region depicted with a second color, each of the head region and the background region is rectangular, the head region is located within the background region and a lower edge of the head region and a lower edge of the background region are coincided, the region depicted with the second color has an area which is N1 times as great as that of the region depicted with the first color, a feature value of the head feature is a1=|b1−c1|, wherein b1 is a sum of values of pixels in the region depicted with the second color, c1 is N1 times as great as a sum of values of pixels in the region depicted with the first color, and N1 is a positive value;
the shoulder feature comprises a shoulder region depicted with the first color and a background region depicted with the second color, each of the shoulder region and the background region is rectangular, the shoulder region is located at a lower left corner of the background region with a left edge and a lower edge of the shoulder region and a left edge and a lower edge of the background region being coincided respectively, or the shoulder region is located at a lower right corner of the background region with a right edge and a lower edge of the shoulder region and a right edge and a lower edge of the background region being coincided respectively, the region depicted with the second color has an area which is N2 times as great as that of the region depicted with the first color, a feature value of the shoulder feature is a2=|b2−c2|, wherein b2 is a sum of values of pixels in the region depicted with the second color, c2 is N2 times as great as a sum of values of pixels in the region depicted with the first color, and N2 is a positive value;
the torso feature comprises a vertical torso feature and an inclined torso feature,
the vertical torso feature comprises a first vertical torso feature and a second vertical torso feature, the first vertical torso feature comprises a first vertical torso region depicted with the first color and a background region depicted with the second color, the first vertical torso region and the background region are located in a same rectangle, the region depicted with the second color has an area which is N3 times as great as that of the region depicted with the first color, a feature value of the first vertical torso feature is a3=|b3−c3|, wherein b3 is a sum of values of pixels in the region depicted with the second color, c3 is N3 times as great as a sum of values of pixels in the region depicted with the first color, and N3 is a positive value; the second vertical torso feature comprises a second vertical torso region depicted with the first color and a background region depicted with the second color, each of the second vertical torso region and the background region is rectangular, the second vertical torso region is parallel with the background region in a vertical direction, the region depicted with the first color has an area equal to that of the region depicted with the second color, the region depicted with the first color is separated from the region depicted with the second color by M1 pixels, a feature value of the first vertical torso feature is a4=|b4−c4|, wherein b4 is a sum of values of pixels in the region depicted with the second color, and c4 is a sum of values of pixels in the region depicted with the first color; and
the inclined torso feature comprises an inclined torso region depicted with the first color and a background region depicted with the second color, each of the inclined torso region and the background region is rectangular, an inclination angle of the inclined torso region is equal to an inclination angle of the background region, and the background region is located at left side or right side or upper side of the inclined torso region, the region depicted with the first color has an area equal to that of the region depicted with the second color, the region depicted with the first color is separated from the region depicted with the second color by M2 pixels, a feature value of the inclined torso feature is a5=|b5−c5|, wherein b5 is a sum of values of pixels in the region depicted with the second color, and c5 is a sum of values of pixels in the region depicted with the first color.

6. An apparatus for detecting a generalized passerby, comprising a processor and a non-transitory processor-readable medium having processor-executable instructions stored thereon that, when executed by the processor, cause the apparatus to:
  acquire an input image; and
  determine whether a preset common feature of a wheel exists in the input image, select an image window at left side or right side or upper side of a center of a region where the preset common feature of the wheel is located in a case that the preset common feature of the wheel exists in the input image, input the selected image window into a preset upper-body classifier, detect whether an upper body of a passerby exists in the selected image window and output a first detection result, wherein the preset upper-body classifier is generated by training with a preset common feature of a generalized passerby, the preset common feature of the generalized passerby comprises a common feature of a human body, and the preset common feature of the wheel comprises a circle feature and an oval feature,
  wherein selecting the image window at left side or right side or upper side of the center of the region where the preset common feature of the wheel is located in a case that the preset common feature of the wheel exists in the input image comprises:
  determining a size of the image window based on a radius of the region where the preset common feature of the wheel is located; and
  determining a position of the image window based on the radius of the region where the preset common feature of the wheel is located and the center of the region where the preset common feature of the wheel is located.

7. The apparatus for detecting the generalized passerby according to claim 6, wherein the instructions further cause the apparatus to pre-process the input image, input the pre-processed image into a preset whole-body classifier, detect whether a whole body of a passerby exists in the pre-processed image and output a second detection result, wherein the preset whole-body classifier is generated by training with a preset common feature of a generalized passerby, and the preset common feature of the generalized passerby comprises a common feature of a human body.

8. The apparatus for detecting the generalized passerby according to claim 7, wherein pre-processing the input image and inputting the pre-processed image into the preset whole-body classifier comprises acquiring at least two images having different resolutions by processing the input image using a pyramid down-sampling technology, respectively dividing the images having different resolutions into a plurality of small-window images having a same size as those of samples for training the preset whole-body classifier, and inputting the small-window images into the preset whole-body classifier in sequence.

9. The apparatus for detecting the generalized passerby according to claim 6, wherein
  determining the size of the image window based on the radius of the region where the preset common feature of the wheel is located comprises:
  selecting an image window having a width of $w=2kr$ and a length of $l=3kr$; and
  determining the position of the image window based on the radius of the region where the preset common feature of the wheel is located and the center of the region where the preset common feature of the wheel is located comprises:
  determining the position of the image window, with the position of the image window being within a value range of $[x-6r, x+6r]$ in a horizontal direction and within a value range of $[y-3r, y+3r]$ in a vertical direction,
  wherein k is a scaling factor, a value range of k is greater than or equal to 1 and less than or equal to 3, r is a radius of the region where the preset common feature of the wheel is located, and x and y are coordinates of the center of the region where the preset common feature of the wheel is located.

* * * * *